Patented May 20, 1941

2,242,529

UNITED STATES PATENT OFFICE 2,242,529

METHOD OF PRODUCING RESIN SOAP

Arthur Langmeier, Wilmington, Del., assignor to Hercules Powder Company, Wilmington, Del., a corporation of Delaware No Drawing. Application October 25, 1938, Serial No. 236,895

6 Claims. (Cl. 260—105)

This invention relates to an improved method for the preparation of soap made from the resin obtained as a by-product in the refining of FF wood rosin to a pale grade of wood rosin.

Heretofore, it has been known to produce a soap by saponification of rosin with an alkali in liquid, aqueous medium at temperatures of approximately 100° C. In such a process the viscosity of the soap from the resin obtained as a by-product in the refining of FF wood rosin is quite high due to the high melting point of the resin. The high viscosity renders adequate mixing and control difficult.

Now, in accordance with this invention, I have found that I may produce substantially neutral soap from the resin obtained as a by-product in the refining of FF wood rosin by a much simpler process than has hitherto been used. According to my process, the soap is produced without the use of heat.

The resin obtained as a by-product in the refining of FF wood rosin which I employ in my improved method of preparation of soap therefrom is hereby defined as the dark-colored, hard resin that is obtained as a by-product when FF wood rosin is dissolved in a suitable solvent, such as a volatile petroleum hydrocarbon, and refined to pale grades of wood rosin by any of the methods known to the art.

Thus, the resin may be, more specifically, the dark-colored resin obtained as a by-product when FF wood rosin is dissolved in a low boiling petroleum hydrocarbon and refined to pale grades of wood rosin by treatment with furfural. Other refining agents such as, for example, fuller's earth, phenol, sulfur dioxide, chlorohydrin, furfuryl alcohol, resorcinol, etc., may be used. The resin may also be obtained as the distillation residue in the distillation of FF wood rosin to produce pale grades of wood rosin. The by-product resin will have the following approximate analysis:

Acid number_____ 105–140
Sapon. number_____ 150–170
M. P. (Hercules drop method)
    degrees Fahrenheit___ 175–210
Unsaponifiable_____per cent__ 10–20
Gasoline insoluble_____do____ 30–80
Petroleum ether insoluble_____do____ 30–80

In carrying out my improved procedure for making soap from the resin obtained as a by-product in the refining of FF wood rosin, I prefer to use the resin in pulverized form, prefer- ably finer than 50 mesh. The process is carried out in two stages.

In the first stage the pulverized by-product resin is dispersed in cold water. Dispersion may be accomplished in any convenient manner, such as by addition of a small amount of alkali to the water, say about 2 to about 10 per cent of the alkali required for saponification of the resin. Likewise, the pulverized resin may be dispersed in the water with any suitable dispersing agent, such as, for example, a solution of casein in sodium hydroxide, sodium oleate, sodium alginate, triethanolamine oleate, sulfated higher alcohols, sulfonated higher alcohols, sulfonated naphthalenes, bentonite, pine oil, etc. The pulverized by-product resin may also be dispersed in water mechanically without the use of agents as above. Such mechanical dispersion may be accomplished by making a heavy paste of about 60% or more pulverized by-product resin and water in a suitable type of mixer, adding water and mixing until a smooth paste results. Dilution of the smooth paste to lower solids content is then preferable for convenience of handling in the subsequent operation.

The above dispersion of the by-product resin in water may be carried out over a wide range of concentration. I have prepared satisfactory dispersions in concentrations of about 10 per cent to about 50 per cent by weight, but prefer to carry out the dispersion with about 20 to about 40 per cent solids.

In the second stage the pulverized by-product resin dispersed in water as described above is saponified with alkali without the use of heat. The saponification is carried out by addition of a concentrated alkali solution, such as a solution of an alkali metal hydroxide, to the dispersion with mechanical agitation.

Although I have described my procedure as involving first the dispersion of the pulverized by-product resin in water, then the saponification of the resin by addition of alkali, I find that other procedures may be used to produce the same result. Thus, I may saponify the resin by adding it in dry, pulverized form to the alkali solution, thereby dispersing and saponifying the resin in one operation.

As specific examples of my improved method of preparation of soap from the resin obtained as a by-product in the refining of FF wood rosin, the following are illustrative:

Example 1

Forty-five parts by weight of pulverized resin obtained as a by-product in the refining of FF wood rosin were added to a solution of 0.1 part by weight of sodium hydroxide dissolved in 45 parts by weight of water. After agitation had continued for about two minutes, a solution of 4.3 parts by weight of sodium hydroxide dissolved in 15.7 parts by weight of water were added to the dispersion at room temperature with agitation. After agitation had continued for about 30 minutes the soap was ready for use, for example, as a sizing agent. It had the following analysis:

|  | Per cent |
|---|---|
| Free resin | 2.7 |
| Free alkali as NaOH | 0.05 |
| Total solids | 45.6 |

Example 2

Twenty-five parts by weight of pulverized resin obtained as a by-product in the refining of FF wood resin were added with agitation to a solution of 0.04 part by weight of sodium hydroxide dissolved in 223 parts by weight of water. After agitation had continued for about two minutes, a solution of 2.1 parts by weight of sodium hydroxide dissolved in 7.9 parts by weight of water was added at room temperature with agitation. After agitation had continued for about 30 minutes the soap was ready for use. It showed the following analysis:

|  | Per cent |
|---|---|
| Fre resin | 1.1 |
| Free alkali as NaOH | 0.04 |
| Total solids | 10.1 |

Example 3

Fifty parts by weight of pulverized resin obtained as a by-product in the refining of FF wood rosin were added with agitation to a solution of 0.25 part by weight of potassium hydroxide dissolved in 100 parts by weight of water. After agitating for about two minutes, a solution of 6 parts by weight of potassium hydroxide dissolved in 12 parts by weight of water was added at room temperature with agitation. After agitation had continued for about 30 minutes, the by-product resin soap was suitable for use, for example, as a sizing agent for paper. It had the following analysis:

|  | Per cent |
|---|---|
| Free resin | 0.0 |
| Free alkali as KOH | 0.35 |
| Total solids | 32.3 |

Example 4

Fifty parts by weight of pulverized resin obtained as a by-product in the refining of FF wood rosin were added with agitation to a solution of 101 parts by weight of water and 0.5 part by weight of sulfated lauryl alcohol. To the dispersed resin was added a solution of 4.3 parts by weight of sodium hydroxide and 15.7 parts by weight of water at room temperature and with agitation. The agitation was continued for about 30 minutes. The by-product resin soap had the following analysis:

|  | Per cent |
|---|---|
| Free resin | 2.1 |
| Free alkali as NaOH | 0.05 |
| Total solids | 30.9 |

Example 5

Fifty parts by weight of pulverized resin obtained as a by-product in the refining of FF wood resin were dispersed in a mixture of 0.5 part by weight of pine oil and 100 parts by weight of water at room temperature with agitation. A solution of 4.5 parts by weight of sodium hydroxide dissolved in 9 parts by weight of water was then added at room temperature with agitation. After agitation had continued for about 30 minutes the soap had the following analysis:

|  | Per cent |
|---|---|
| Free resin | 0.0 |
| Free alkali as NaOH | 0.37 |
| Total solids | 31.8 |

In the above examples potassium hydroxide and sodium hydroxide are considered as equivalents, substitution of one for the other being on the basis of equivalent amounts.

In practicing my invention, I prefer to use a concentrated solution of alkali to effect the saponification, as the reaction is more rapid when the concentration of alkali is high. My preferred strength of alkali is about 20 to about 50 per cent. It will be appreciated, however, that the concentration of alkali is not considered critical, the lower limit being determined by the reactivity with the resin and the upper limit being dependent on the solution strength which can be conveniently prepared and handled.

The soap solution produced from the resin produced as a by-product in the refining of FF wood rosin in accordance with this invention may be used as a sizing material, such as for sizing of paper and board.

It will be appreciated that the details and proportions set forth in the examples herein are illustrative only, and that the invention as broadly described is in no way limited thereby.

What I claim and desire to protect by Letters Patent is:

1. A method of preparing a soap solution which comprises dispersing in water the resin obtained as a by-product in the refining of FF wood rosin to a pale grade of wood rosin and characterized by an acid number from about 105 to about 140, a saponification number from about 150 to 170, an unsaponifiable content from about 10 to about 20 per cent, a drop melting point from about 175° to about 210° F. and a gasoline insoluble content from about 30 to about 80 per cent, carrying out said dispersion with about 10 to about 50 per cent by weight solids concentration, and saponifying the said resin at room temperature with an aqueous alkali metal hydroxide solution of about 20 to about 50 per cent concentration to give a substantially neutral soap.

2. A method of preparing a soap solution which comprises dispersing in water the resin obtained as a by-product in the refining of FF wood rosin to a pale grade of wood rosin and characterized by an acid number from about 105 to about 140, a saponification number from about 150 to about 170, an unsaponifiable content from about 10 to about 20 per cent, a drop melting point from about 175° to about 210° F. and a gasoline insoluble content from about 30 to about 80 per cent, carrying out said dispersion with about 20 to about 40 per cent by weight solids concentration, and saponifying the said resin at room temperature with an aqueous alkali metal hydroxide solution of about 20 to about 50 per cent concentration to give a substantially neutral soap.

3. A method of preparing a soap solution which comprises dispersing in water the resin obtained as a by-product in the refining of FF wood rosin to a pale grade of wood rosin and characterized by an acid number from about 105 to about 140, a saponification number from about 150 to about 170, an unsaponifiable content from about 10 to about 20 per cent, a drop melting point from about 175° to about 210° F. and a gasoline insoluble content from about 30 to about 80 per cent, carrying out said dispersion with about 10 to about 50 per cent by weight solids concentration by addition of alkali, and saponifying the said resin at room temperature with an aqueous alkali metal hydroxide solution of about 20 to about 50 per cent concentration to give a substantially neutral soap.

4. A method of preparing a soap solution which comprises dispersing in water the resin obtained as a by-product in the refining of FF wood rosin to a pale grade of wood rosin and characterized by an acid number from about 105 to about 140, a saponification number from about 150 to about 170, an unsaponifiable content from about 10 to about 20 per cent, a drop melting point from about 175° to about 210° F. and a gasoline insoluble content from about 30 to about 80 per cent, carrying out said dispersion with about 10 to about 50 per cent by weight solids concentration with a dispersing agent, and saponifying the said resin at room temperature with an aqueous alkali metal hydroxide solution of about 20 to about 50 per cent concentration to give a substantially neutral soap.

5. A method of preparing a soap solution which comprises dispersing in water the resin obtained as a by-product in the refining of FF wood rosin to a pale grade of wood rosin and characterized by an acid number from about 105 to about 140, a saponification number from about 150 to about 170, an unsaponifiable content from about 10 to about 20 per cent, a drop melting point from about 175° to about 210° F. and a gasoline insoluble content from about 30 to about 80 per cent, carrying out said dispersion with about 10 to about 50 per cent by weight solids concentration, and saponifying the said resin at room temperature with an aqueous sodium hydroxide solution of about 20 to about 50 per cent concentration to give a substantially neutral soap.

6. A method of preparing a soap solution which comprises dispersing in water the resin obtained as a by-product in the refining of FF wood rosin to a pale grade of wood rosin and characterized by an acid number from about 105 to about 140, a saponification number from about 150 to about 170, an unsaponifiable content from about 10 to about 20 per cent, a drop melting point from about 175° to about 210° F. and a gasoline insoluble content from about 30 to about 80 per cent, carrying out said dispersion with about 10 to about 50 per cent by weight solids concentration, and saponifying the said resin at room temperature with an aqueous potassium hydroxide solution of about 20 to about 50 per cent concentration to give a substantially neutral soap.

ARTHUR LANGMEIER.